(12) United States Patent
Rawls

(10) Patent No.: US 8,770,552 B2
(45) Date of Patent: Jul. 8, 2014

(54) FENCEPOST SLEEVE AND RETAINER CLIP FOR PROVIDING ELECTRICAL CONDUIT SUPPORT

(75) Inventor: Julie W. Rawls, Dimebox, TX (US)

(73) Assignee: Julie W. Rawls, Dimebox, TX (US)

( * ) Notice: Subject to any disclaimer, the term of this patent is extended or adjusted under 35 U.S.C. 154(b) by 187 days.

(21) Appl. No.: 12/789,556

(22) Filed: May 28, 2010

(65) Prior Publication Data

US 2010/0308292 A1  Dec. 9, 2010

Related U.S. Application Data

(60) Provisional application No. 61/213,396, filed on Jun. 3, 2009.

(51) Int. Cl.
*E04H 17/02* (2006.01)
*E04H 17/10* (2006.01)
*E04H 17/12* (2006.01)
*H01B 17/14* (2006.01)

(52) U.S. Cl.
CPC .............. *E04H 17/12* (2013.01); *H01B 17/145* (2013.01)
USPC .................... 256/47; 256/10; 256/32; 52/301

(58) Field of Classification Search
CPC ...... H01B 17/00; H01B 17/145; H01B 17/16; E04H 17/02; E04H 17/04; E04H 17/12; E04H 17/24
USPC ................. 256/10, 32, 47, 48, 49, 50, 54, 58, 256/65.14, 65.01, 65.03, 65.07, 52; 403/308; D25/135, 126, 38.1, 39, 40, D25/41.1, 42, 43, 44, 45, 46; 52/301; 174/161 F, 163 F, 137 R, 158 R, 158 F
See application file for complete search history.

(56) References Cited

U.S. PATENT DOCUMENTS

| 546,383 | A | * | 9/1895 | Gerstenlauer | 174/168 |
|---|---|---|---|---|---|
| 609,888 | A | * | 8/1898 | Leonard | 174/172 |
| 1,038,418 | A | * | 9/1912 | Nelson | 256/48 |
| 2,712,567 | A | * | 7/1955 | Caltrider | 174/161 F |
| 3,074,675 | A | * | 1/1963 | Brown | 248/74.3 |
| 3,807,698 | A | * | 4/1974 | Enoksson | 256/10 |
| 4,465,263 | A | * | 8/1984 | Robbins, Jr. | 256/52 |
| 4,520,231 | A | * | 5/1985 | Hubbell | 256/10 |
| 4,623,102 | A | * | 11/1986 | Hough, Jr. | 248/68.1 |
| 4,680,428 | A | * | 7/1987 | Wilson, Jr. | 256/10 |
| 4,684,107 | A | * | 8/1987 | Robbins, Jr. | 256/19 |
| RE32,707 | E | * | 7/1988 | Robbins, Jr. | 256/52 |
| 4,860,996 | A | * | 8/1989 | Robbins, III | 256/10 |
| 4,866,218 | A | * | 9/1989 | Wilson, Jr. | 256/10 |
| 5,063,274 | A | * | 11/1991 | Johnson | 248/297.51 |
| 5,363,618 | A | * | 11/1994 | Underwood | 52/301 |
| 5,956,875 | A | * | 9/1999 | Aughenbaugh | 256/48 |

(Continued)

*Primary Examiner* — Daniel P. Stodola
*Assistant Examiner* — Matthew R McMahon
(74) *Attorney, Agent, or Firm* — Robert C. Rolnik

(57) ABSTRACT

A post cover for engaging with a fence post and supporting at least one strand. The post cover may include an extrusion portion supporting a strand-carrying portion, the strand-carrying portion formed of an electrically resistant material. In addition, the post cover may include a top portion supported by the strand-carrying portion, wherein the extrusion portion and strand-carrying portion each have a longitudinal cavity configured to admit the fence post; the top portion formed contiguous to the strand-carrying portion and comprising an extension to close the cavity from above.

11 Claims, 8 Drawing Sheets

(56) References Cited

U.S. PATENT DOCUMENTS

| | | | |
|---|---|---|---|
| 5,975,501 A * | 11/1999 | Berg et al. | 256/48 |
| 6,131,885 A * | 10/2000 | Berg et al. | 256/10 |
| 6,563,055 B1 * | 5/2003 | Burdick | 174/158 F |
| 6,612,551 B1 * | 9/2003 | Roy | 256/1 |
| 6,691,479 B1 * | 2/2004 | Tscharner | 52/301 |
| 7,178,789 B1 * | 2/2007 | Lehmann | 256/47 |
| 7,968,797 B2 * | 6/2011 | Williams | 256/10 |
| 8,122,659 B2 * | 2/2012 | Davidson | 52/301 |
| 2007/0114506 A1 * | 5/2007 | McNeill | 256/1 |

\* cited by examiner

US 8,770,552 B2

FENCEPOST SLEEVE AND RETAINER CLIP FOR PROVIDING ELECTRICAL CONDUIT SUPPORT

CROSS REFERENCE TO RELATED APPLICATIONS

This application claims the benefit of U.S. patent application Ser. No. 61/213,396 (entitled "All-N-One T-Post Cover"), filed on Jun. 3, 2009, which is herein incorporated by reference.

BACKGROUND OF THE INVENTION

1. Field of the Invention

The present invention relates generally to a post cover for supporting strands on a stranded fence. More specifically, the present invention relates to supporting electrified strands in a manner to hold the strand isolated from the ground.

2. Description of the Related Art

A cheap fence building material that is durable in outdoor environments is metal posts, specifically T-posts. In order to control the movement of pets, livestock and the like, owners of property enclose corrals with stranded fences, including, for example, fences that have one or more strands connected to a current generating device. Such fences have been beneficial in that animals such as horses when touching the electrified strands, feel pain, and consequently, avoid further contact with the fence. A strand is any flexible material that is the primary horizontal barrier used in electric fence construction. The strand can be electrical conduit. It is appreciated that a strand can include a single wire conduit, wires interwoven with fabric to form a ribbon, or wires interwoven into a rope, among others. In addition to electrically conductive strands, the embodiments described herein can also support strands that are not electrically conductive.

To keep the T-posts inexpensive, manufacturers make such posts narrow. However, manufacturers do not make the posts so narrow that the T-posts are susceptible to damage from installation. In addition, manufacturers make the posts thick and strong enough that the posts do not buckle under most livestock pressures that can be exerted on the posts. Consequently, the posts can be so narrow that an animal attempting to jump the fence can fall downward on the t-post, and suffer life-threatening injuries. Similar risks are present for people as well.

SUMMARY OF THE INVENTION

The present invention provides a post cover for engaging with a fence post and supporting at least one strand. The post cover may include an extrusion portion supporting a strand-carrying portion, the strand-carrying portion formed of an electrically resistant material. In addition, the post cover may include a top portion supported by the strand-carrying portion, wherein the extrusion portion and strand-carrying portion each have a longitudinal cavity configured to admit the fence post; the top portion formed contiguous to the strand-carrying portion and comprising an extension to close the cavity from above.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
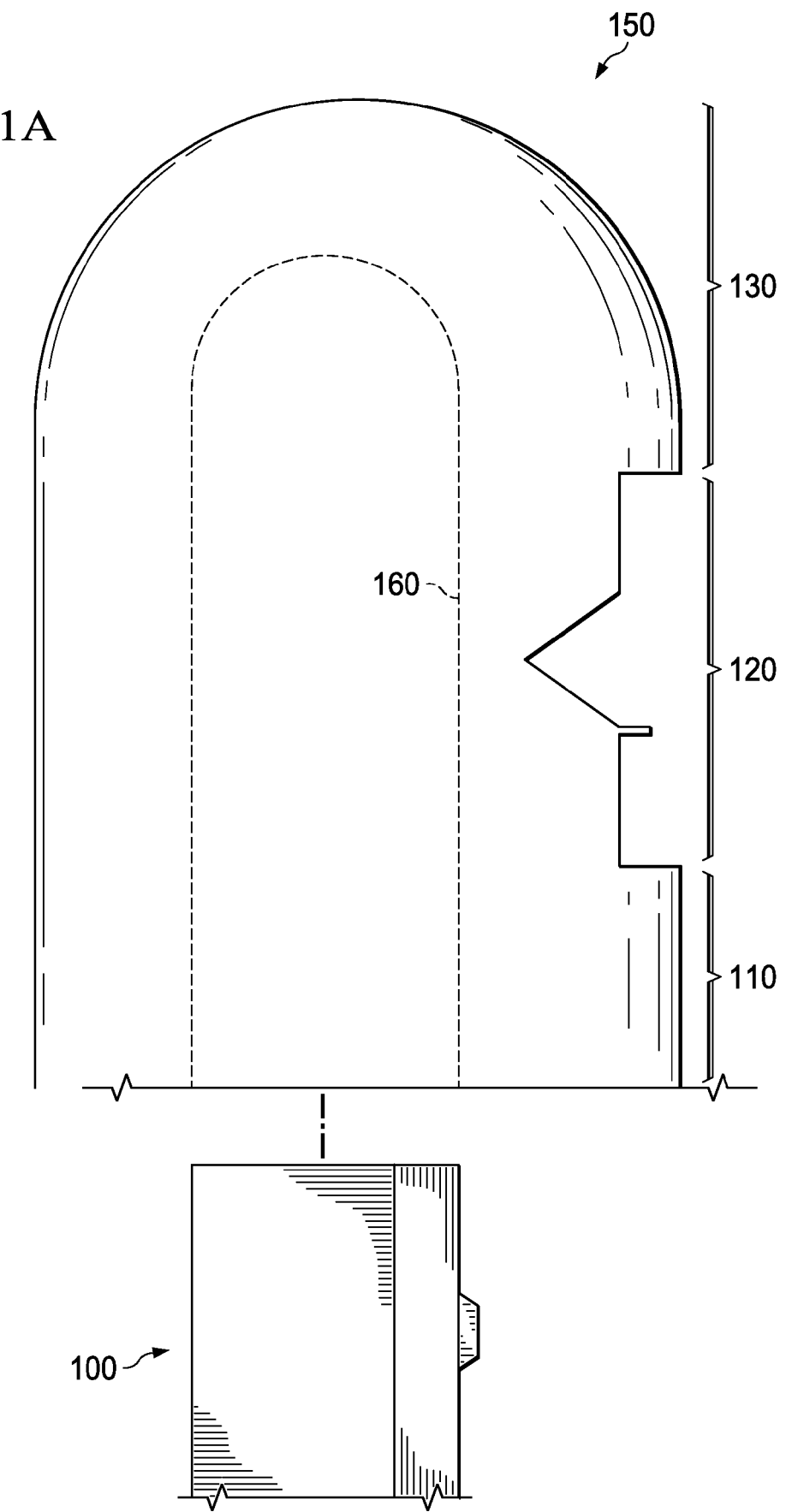
FIG. 1A is an elevation view that shows a cut-away view of prior art T-post 100 and cut-away view of post cover 150.
Figure 1B:
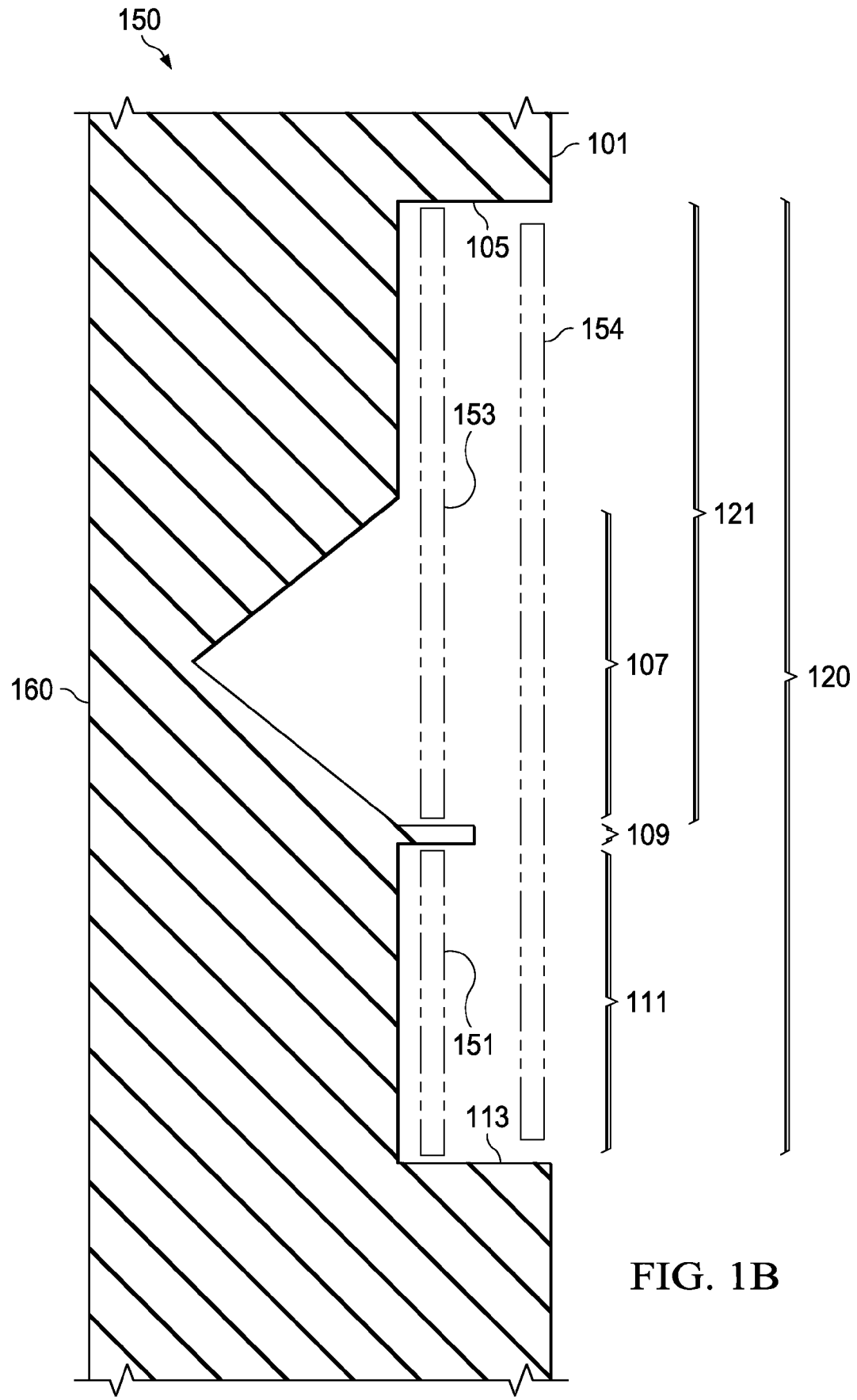
FIG. 1B is a detailed elevation cross-sectional view of at least a strand-carrying portion of a post cover in accordance with an illustrative embodiment of the invention.

With reference now to the figures and in particular with reference to FIG. 1A-1B. FIG. 1A is an elevation view that shows a cut-away view of prior art T-post 100 and cut-away view of post cover 150 in accordance with an illustrative embodiment of the invention. T-post 100 and post cover 150 are oriented in a manner that may permit the post cover to slide around the T-post, after the T-post is affixed to the ground. Post cover 150 includes three broad sections or portions, namely, an extrusion portion 110, strand-carrying portion 120 and top portion 130. Extrusion portion 110, strand-carrying portion 120 and top portion 130 may be formed out of a common electrically resistant material, such as, for example, polypropylene. Each such portion has a common inner surface 160 that forms a longitudinal cavity large enough for a post to be placed therein.

When a post, for example, T-post 100 is placed within the longitudinal cavity, the post can provide support against lateral deflections by virtue of the post being embedded in the ground. Top portion 130 may include an extension to close the cavity from the top of the extension. The extension provides a blunt upper surface having an outermost width larger than a width of the fence post placed in the longitudinal cavity. It is appreciated that the extension can be broader than the post cover portions that support the extension. For example, the extension may extend from a funnel-shaped material to provide a top portion that, at its widest, can be a substantial multiple of the T-post's width.

A cross-section of extrusion portion 110, strand-carrying portion 120 and top portion 130 may include a circular surface that forms cavity wall 160. Accordingly, t-post 100 may be slid through the length of the post cover either until the post cover's lower extremity touches the ground, or until the top of the T-post touches the extension.

Post cover may have one or more longitudinal slots formed into the outer surface 101 of the post cover, of which one is shown in FIG. 1A.

FIG. 1B is a detailed elevation cross-sectional view of at least a strand-carrying portion of a post cover in accordance with an illustrative embodiment of the invention. FIG. 1B shows a cross-section of a post cover as it appears between arrows marked 'B' in FIG. 7 (which is itself a top down view of at least the post cover). A transverse groove is formed from outer surface 101 of strand-carrying portion 120, as it appears in FIG. 1A. A strand-carrying portion is a portion of the post that provides a groove to entrap a strand in such a manner to limit vertical movement of a strand. To rigidly affix a strand having tension applied along its length, the strand-carrying portion may cooperate with a strand clip, explained further below. The transverse groove may include several surfaces that extend in a transverse direction in relation to the post. These surfaces may include upper surface 105, non-vertical groove surfaces 107, ledge surface 109, half inch tape strand surface 111, and lower ledge 113. Further, the surfaces above the ledge surface, but below the upper surface, form intermediate strand surfaces 121. The transverse groove does not extend so far into outer surface 101 as to compromise the isolation of a post housed.

The transverse groove may be arranged to accommodate and support common electrically conducting strands used in making electrified fences. FIG. 1B shows examples of cross-sections of three such strands: half-inch strand 151, one-inch strand 153, and one and a half-inches strand 154. It is important to note that in practice, a fence would be constructed with one such strand in the transverse groove. However, this illustrative embodiment provides a supporting lower ledge 113 that may support at least two types of strand, while also providing ledge surface 109 to support at least one additional type of strand. Accordingly, each such groove may support a strand selected by the fence installer among those commonly available. The strand types include half-inch strand 151, one-inch strand 153, and one and a half-inches strand 154.

Accordingly, the transverse groove can include two or more sub-grooves. A sub-groove is a further indentation within a transverse groove that provides a recess suitable for applying rigid retention of a strand against upward or downward forces that such a strand may receive during operational use. For example, a sub-groove suitable to limit vertical travel of a half-inch strand can be defined by half-inch tape surface 111 which may be a half-inch or smaller in the opening between lower ledge 113 and ledge surface 109. Similarly, a sub-groove suitable to limit vertical travel of a one-inch strand can be defined by ledge surface 109 and upper surface 105 to provide a recess of at least one-inch, sufficient to retain the one-inch strand. It is appreciated that the half-inch strand may be called half-inch tape as made, for example as poly-wire or poly-tape, and include electrified metal conductors within its material.

A one and a half-inch strand may be placed between lower ledge 113 and upper surface 105. The distance between these surfaces can be approximately one and a half-inches, for example, at or below 1.63 inches.

Additional grooves having a similar cross-section as the transverse groove may be placed at additional points along strand-carrying portion 120 of FIG. 1A. Each additional groove is oriented in the same direction as the transverse groove and can be capable of supporting one of several types of strands. The distance between grooves may be such that allow for a flexible selection of strand height and spacing. For example, grooves may be placed approximately every ten-inches along the height of the post cover.

Figure 2A:
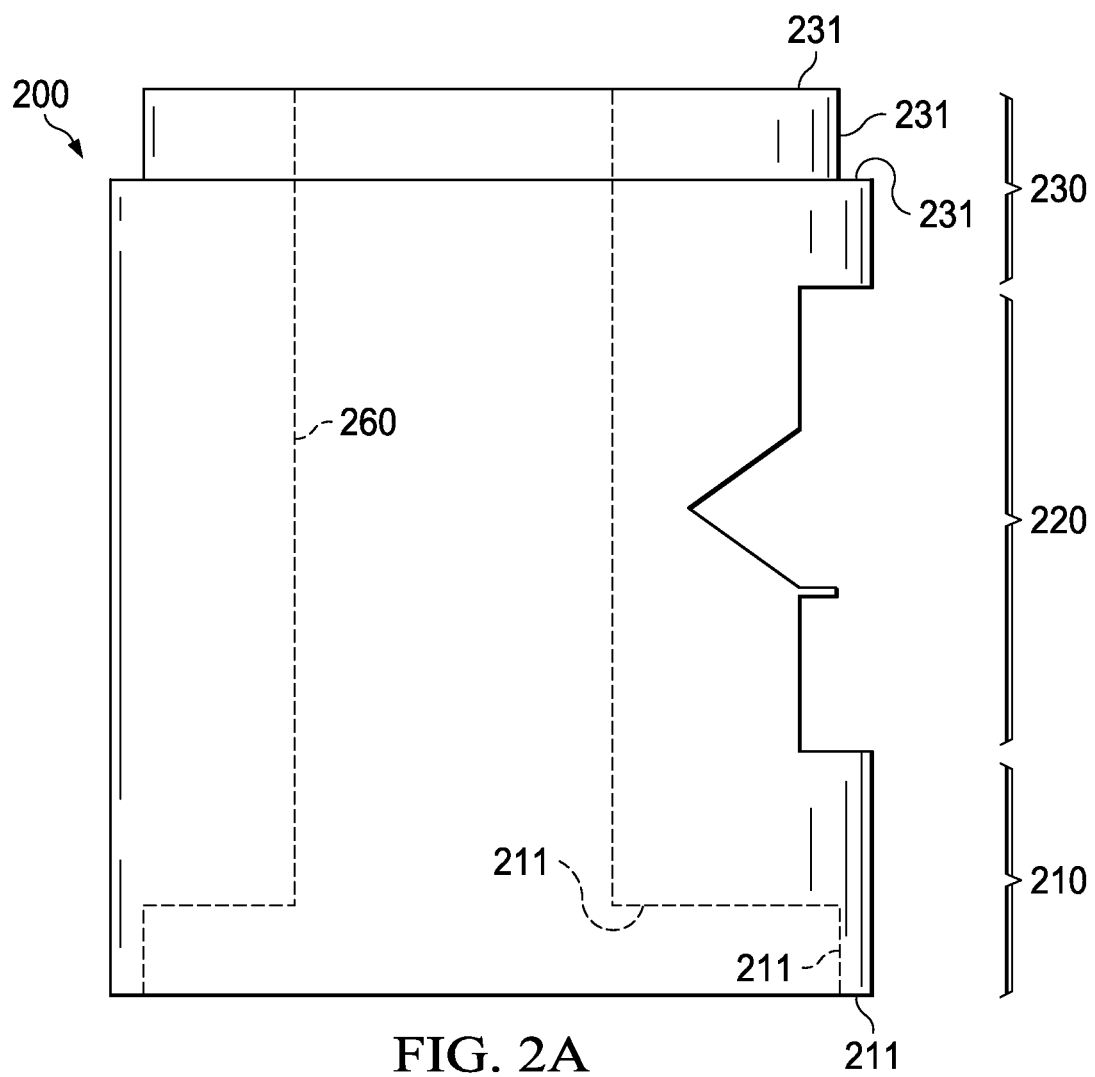
FIG. 2A is an elevation view of a modular post cover in accordance with an illustrative embodiment of the invention.

FIG. 2A is an elevation view of a modular post cover in accordance with an illustrative embodiment of the invention. Modular post cover 200 may be one of several post covers in this illustrative embodiment that cooperate one with another to rigidly support each other to form a longer, whole post cover. Within modular post cover 200 a post is housed in the longitudinal cavity formed by inner surface 260. Accordingly, each post cover may have an extrusion portion that engages with a top portion of a second cover. Thus, each post cover has at least three portions: extrusion portion 210, strand-carrying portion 220, and top portion 230. Top portion 230 has at least one shoulder 231 having a top contour corresponding to at least one reciprocal contour 211 of the post cover. Accordingly, a first post cover can rigidly mate to a second post cover. Such an interoperation of post covers can be used to form a post cover larger than the constituent modular post covers. Such an arrangement may flexibly allow a fence builder to insulate any length of post according to the needs of the fence builder. Although FIG. 2A shows a single transverse groove, it is appreciated that two or more transverse grooves may be placed on the strand-carrying portion in cases where it is desirable to reduce the part count for enclosing a post. For example, in embodiments for post covers with multiple transverse grooves, the grooves may be placed in a repeating pattern every six to ten inches. Accordingly, such a modular post cover may be longer and of proportions that vary from those shown in FIG. 2A.

Figure 2B:
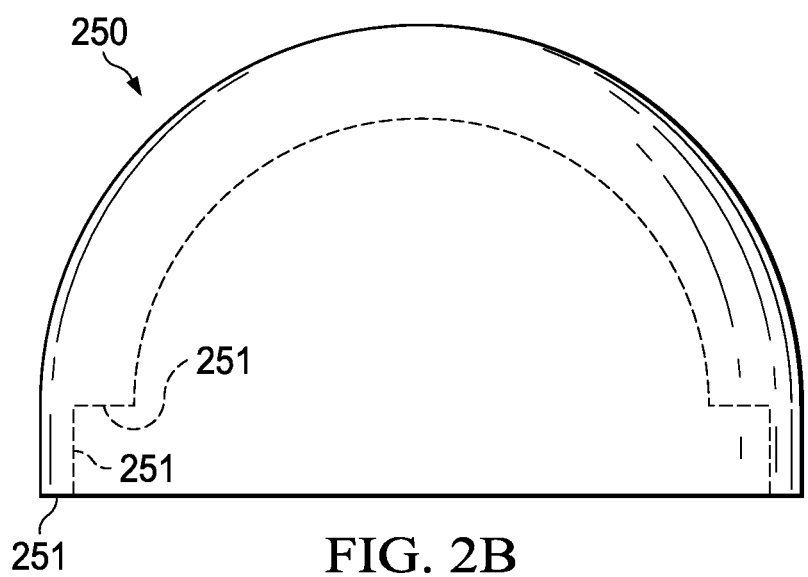
FIG. 2B is an elevation view of a post cover suited for interconnect to the modular post of FIG. 2A in accordance with an illustrative embodiment of the invention.

FIG. 2B is an elevation view of a post cover suited for interconnection to the modular post of FIG. 2A in accordance with an illustrative embodiment of the invention. Blunt top 250 may be dome shaped and be molded to have a reciprocal contour 251 to correspond with at least one shoulder 231 of modular post cover 200.

Figure 3:
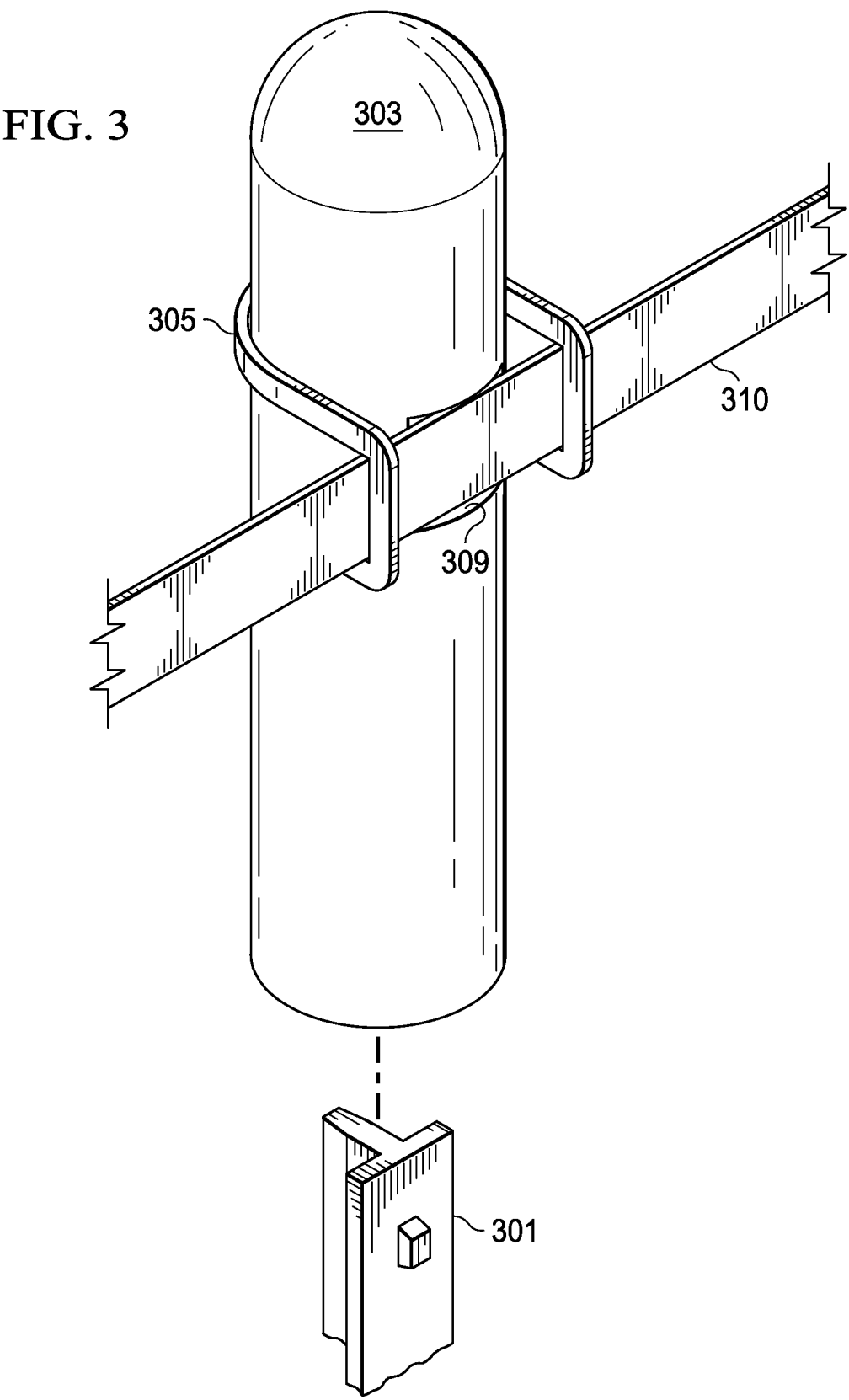
FIG. 3 is a perspective view of a post cover assembled with a ribbon strand and a strand clip in accordance with an illustrative embodiment of the invention.

FIG. 3 is a perspective view of a post cover assembled with a ribbon strand and a strand clip in accordance with an illustrative embodiment of the invention. A post, for example, T-post 301 may provide a support or spine to post cover 303. A transverse groove is visible with at least a portion of a lower ledge 309. In the example shown, the strand is a ribbon strand having tension applied in a generally horizontal direction. Strand 310 is held in the desired location above lower ledge 309, with strand clip 305 placed over and around the post cover (which may be considered an extension to the post). To restrict vertical movement, strand 310 may be rigidly held in the transverse groove, such as non-vertical groove surfaces 107, of FIG. 1B.

Figure 4A:
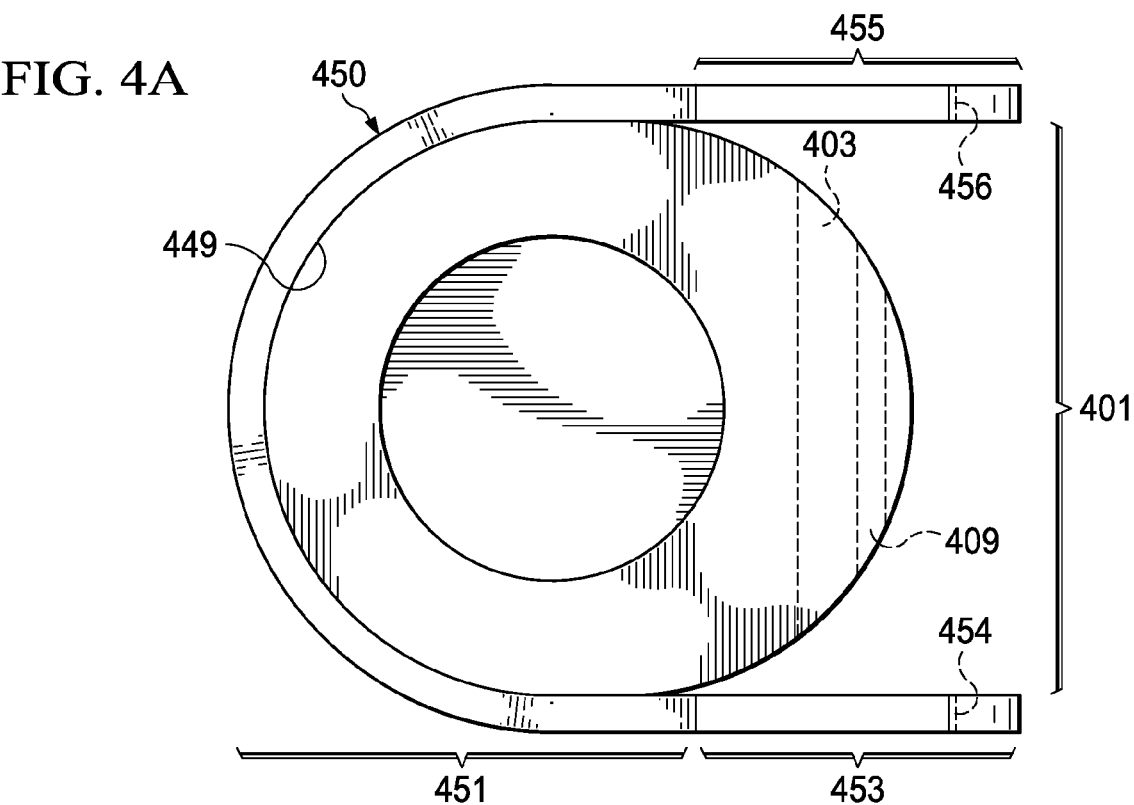
FIG. 4A is a bottom view of a strand clip for engaging with a post or post cover in accordance with an illustrative embodiment of the invention.

FIG. 4A is an underside view of a strand clip for engaging with a post or post cover in accordance with an illustrative embodiment of the invention. Strand clip 450 is an example of a strand capture device. A strand capture device is a clip that holds a strand between a surface of the strand capture device and a post. Post cover 401 includes a groove that includes ledge surface 409. Post cover 401 may be, for example, post cover 150 of FIG. 1A or post cover 200 of FIG. 2. Groove wall 403 may be a surface of a transverse groove, for example, half-inch tape surface 111 of FIG. 1 or a surface of transverse groove 220 of FIG. 2. Strand clip 450 includes U-shaped body 451, which wraps around post cover 401. A 'U' shape or U-shaped body is a shape that has two ends and a body that bows outwardly from those ends. Such a shape can have one or more discontinuities such that the 'U' shape may appear as a 'V' shape, or a 'U' with a flat bottom. Accordingly, by U-shaped body, it is meant any shape that is substantially U-shaped. In other words, the strand clip can have flat portions, creases, or peaks along the body of the 'U' and still be substantially U-shaped or U-shaped. The shape of the strand clip is one that may partially encircle a post cover with a substantial part of the inside surface of the 'U' shape in contact with the post cover. Strand clip 450 includes post-facing backside 449. Post-facing backside 449 is the surface, generally at the bottom of the 'U' shape that abuts to a post or a post cover. By abutting to the post or post cover, post-facing backside 449 provides a limit to which surfaces the prongs of the strand clip may extend to beyond the post.

Strand clip 450 includes two prongs, namely prong 453 and prong 455. The prongs include several features. Prong 455 includes first prong strand capture surface 456 that is adapted to substantially face the fence post when the post-facing backside abuts the first side of the fence post. Prong 453 includes second prong strand capture surface 454 that is adapted to substantially face the fence post when the post-facing backside abuts the first side of the fence post. In the relative positions shown, strand clip 450 and post cover 401 cooperate to provide a channel that extends vertically along the page in the FIG. 4A for a tensioned strand to be placed in an interlocked configuration with post and strand clip 450. An installer may place strand clips over loose strands while installing a fence. After the pieces are substantially in place, the installer can apply tension to the strands. The posts and post covers can be placed either on the animal side of a fenced in pasture, or on the outside of the pasture.

Figure 4B:
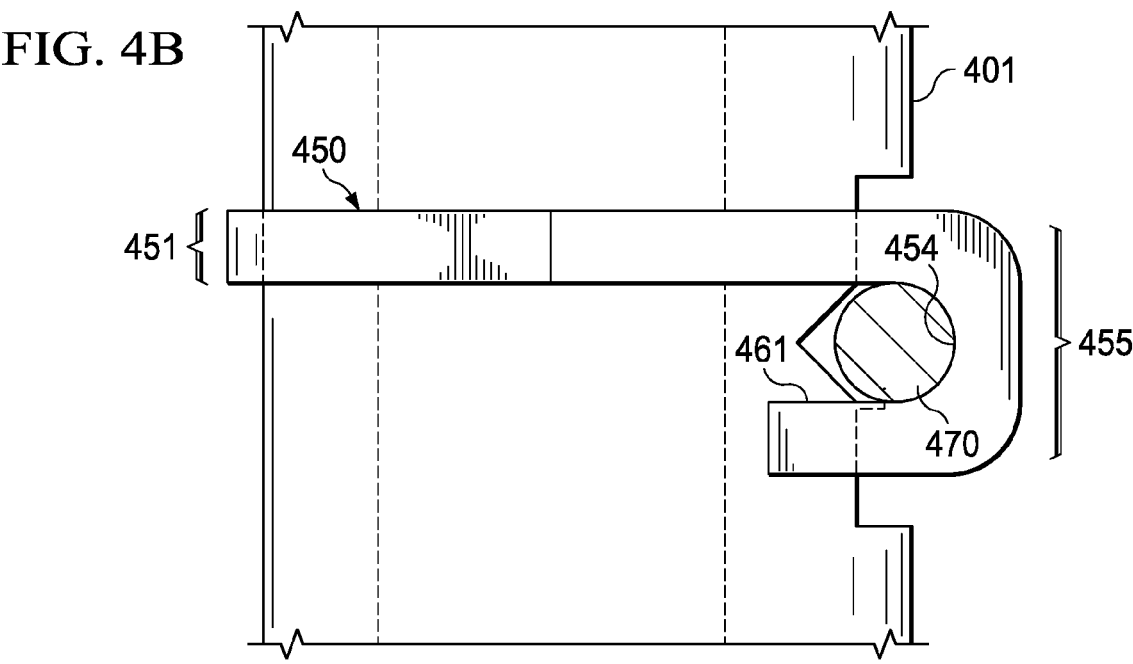
FIG. 4B is an elevation view of the strand clip 450 and post together with a round cross section strand in accordance with an illustrative embodiment of the invention.

FIG. 4B is an elevation view of the strand clip 450 and post together with a round cross section strand in accordance with an illustrative embodiment of the invention. Strand clip includes prong strand shelf 461 that is substantially parallel a surface of the u-shaped body 451. Strand 470 may rest on ledge surface 409, as previously shown as ledge surface 109 in FIG. 1B. Similarly, if upward pressure is applied on strand 470, u-shaped body 451 can provide an upper surface that limits movement of strand 470 upwards. Otherwise, post cover 401 can provide sideways limits to movement in a groove wall. First prong strand capture surface 454 (of prong 455) is a continuous surface that blends with the surface of the u-shaped body and the first prong strand shelf 461. Similarly, second prong strand capture surface (not shown) is a continuous surface that blends with the surface of the u-shaped body and the second prong strand shelf. Accordingly, FIGS. 4A and 4B may be adapted to a strand having a generally elongated cross-section.

Figure 5A:
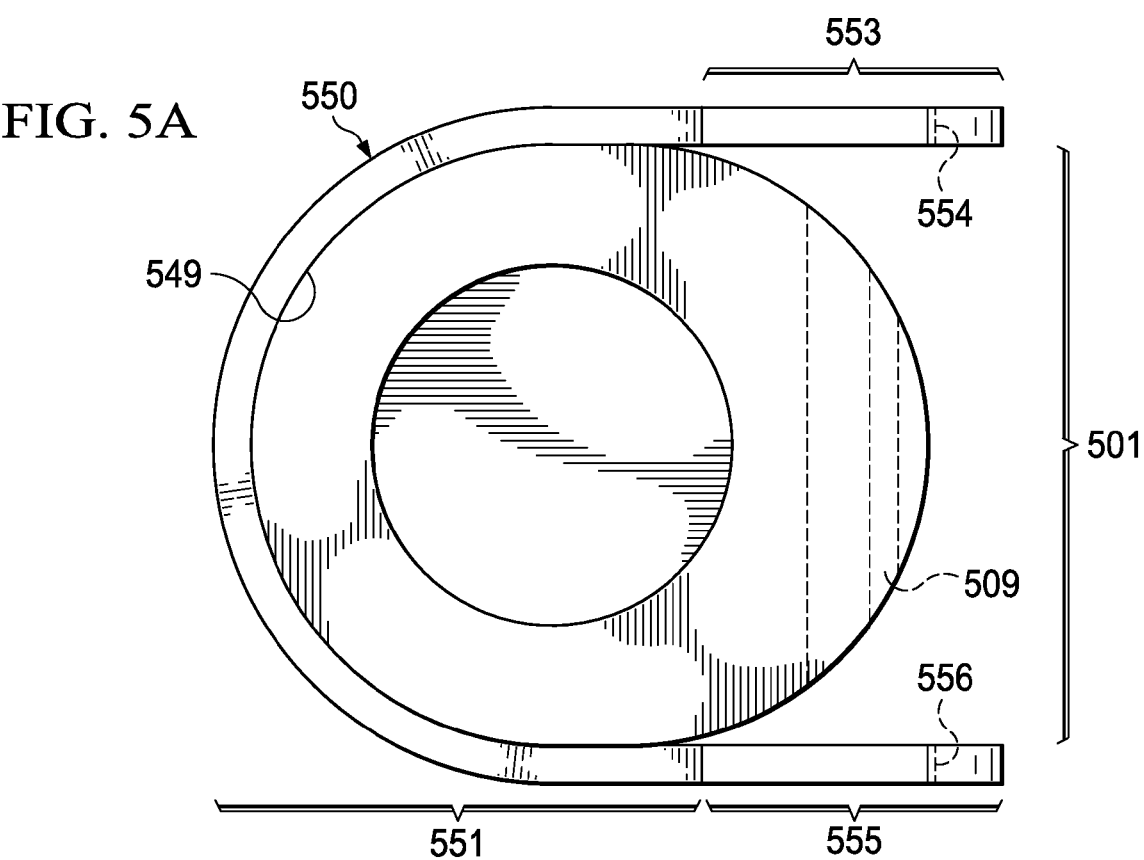
FIG. 5A is a bottom view of a strand clip for engaging with a post or post cover in accordance with an additional illustrative embodiment of the invention.

FIG. 5A is an underside view of a strand clip for engaging with a post or post cover in accordance with an additional illustrative embodiment of the invention. Strand clip 550 is an example of a strand capture device. A strand capture device is a device that holds a strand between a surface of the strand capture device and a post. Post cover 501 includes a groove that includes ledge surface 509. Post cover 501 may be, for example, post cover 150 of FIG. 1A or post cover 200 of FIG. 2. Strand clip 550 includes U-shaped body 551, which wraps around post cover 501. Strand clip 550 includes post-facing backside 549. Post-facing backside 549 is the surface, generally at the bottom of the 'U' shape that abuts to a post or a post cover. By abutting to the post or post cover, the post-facing backside 549 provides a limit to which surfaces in prongs of the strand clip may extend beyond the post.

Strand clip 550 includes two prongs, namely prong 553 and prong 555. The prongs include several features. Prong 555 includes first prong strand capture surface 556 that is adapted to substantially face the fence post when the post-facing backside abuts the first side of the fence post. Prong 553 includes second prong strand capture surface 554 that is adapted to substantially face the fence post when the post-facing backside abuts the first side of the fence post. In the relative positions shown, strand clip 550 and post cover 501 cooperate to provide a channel that extends vertically along the page in the FIG. 5A for a tensioned strand to be placed in an interlocked configuration with post and strand clip 550.

Figure 5B:
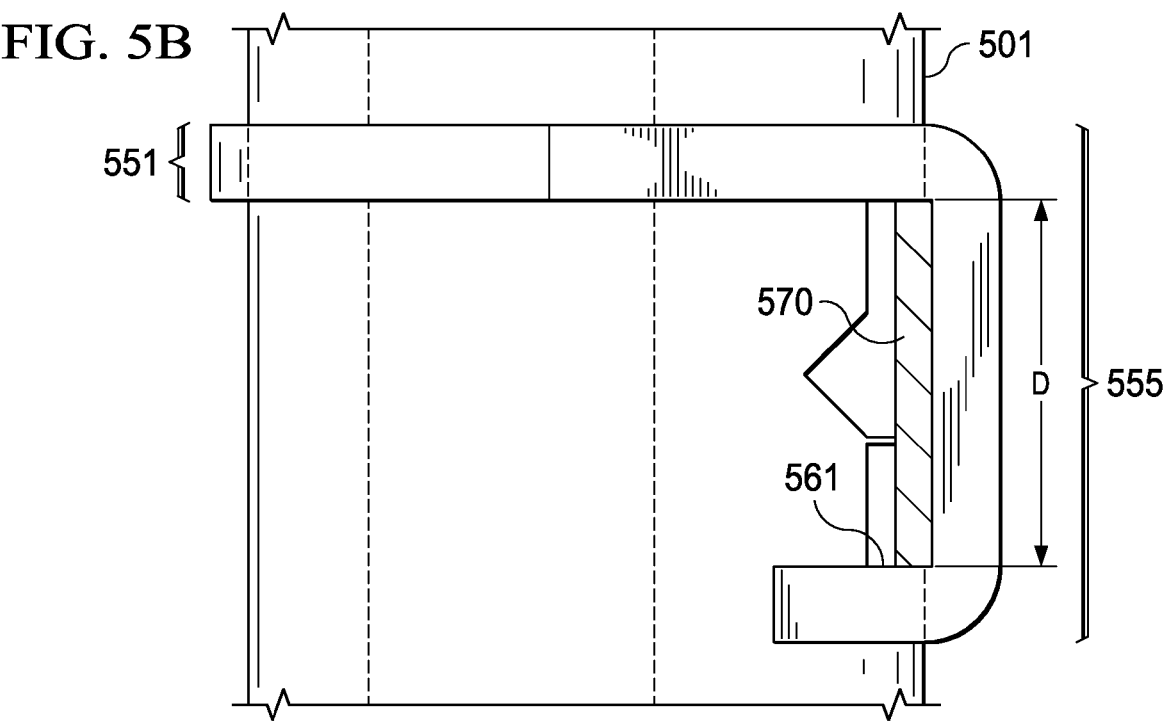
FIG. 5B is an elevation view of the strand clip 550 and post together with a generally elongated cross-section strand and corresponds with FIG. 5A in accordance with an additional illustrative.

FIG. 5B is an elevation view of the strand clip 550 and post together with a generally elongated cross-section strand and corresponds with FIG. 5A in accordance with an additional illustrative embodiment of the invention. Strand clip includes prong strand shelf 561 that is substantially parallel to a surface of the U-shaped body 551. Strand 570 may rest on prong strand shelf 561. Prong strand shelf 561 may be at least half an inch from the U-shaped body, as depicted by distance, D, in FIG. 5B. Depending on the shape of the strand preferred by the fence builder, the distance, D, may be approximately half an inch, approximately an inch, or approximately an inch and a half. Similarly, if upward pressure is applied on strand 570, U-shaped body 551 can provide an upper surface that limits movement of strand 570 upwards. Otherwise, post cover 501 can provide sideways limits to movement in a groove wall. First prong strand capture surface 554 has a first edge in common with the first prong strand shelf 561. Similarly, second prong strand capture surface (not shown) has a first edge in common with the second prong strand shelf. Accordingly, FIGS. 5A and 5B may be adapted to a strand having a generally elongated cross-section.

Figure 6:
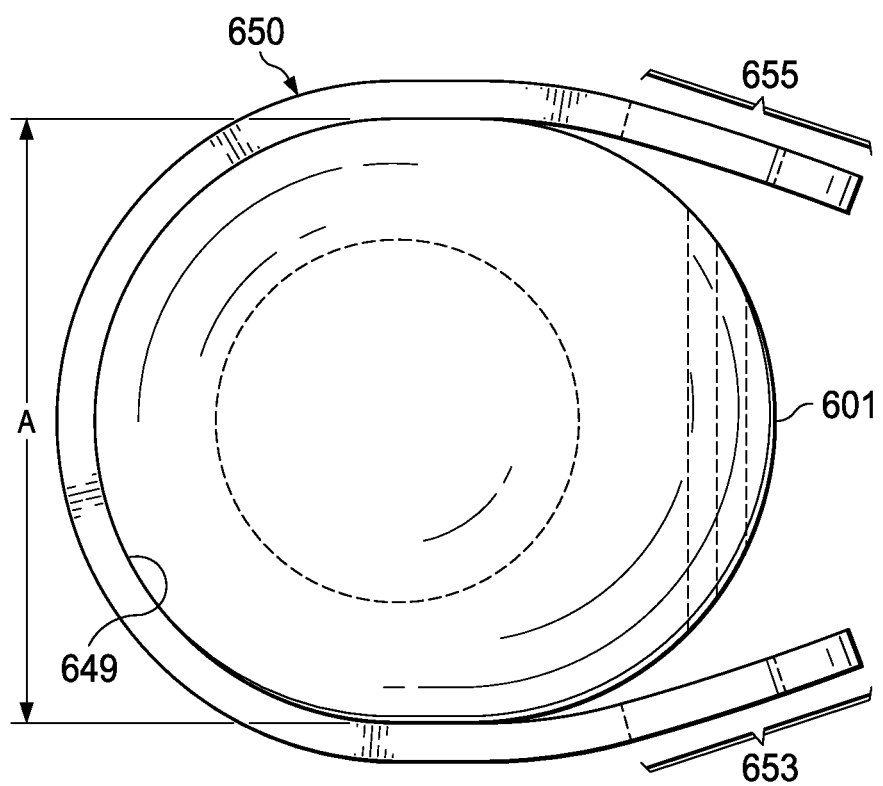
FIG. 6 is a top view of a third strand clip in accordance with an illustrative embodiment of the invention.

FIG. 6 is a top view of a third strand clip in accordance with an illustrative embodiment of the invention. Strand clip 650 may be u-shaped. Strand clip 650 has a first prong 655 and a second prong 653. Third strand clip 650 may be made of a resilient but flexible material, such as, for example, metal. The metal may be formed in any suitable manner, including die cast or formed from wire or other extrusions. First prong 655 and second prong may, in an unstressed form, provide a gap that is narrower than a broadest part of the post 601, depicted between arrows marked 'A'. A maximum opening in the U-shaped body is the distance between an inner surfaces of the U-shaped body along the cross-section occurring between the arrows marked 'A'. Nevertheless, a material may be selected that permits flexing of the U-shape sufficiently to open the gap so that a third strand clip can be pushed around the broad portion of the post 601 from the side, as depicted in FIG. 6. After third strand clip 650 is placed to cause strand clip facing backside 649 to abut post 601, the U-shaped body may return to the shape that the third strand clip formerly had, or nearly so. Accordingly, a mild friction between clip and post may engage third strand clip 650 to hold its vertical position relative the post 601. Strand clip 650 may be arranged to have prongs in the form of those shown in FIGS. 4A and 4B, or in the form of those shown in FIGS. 5A and 5B.

Figure 7:
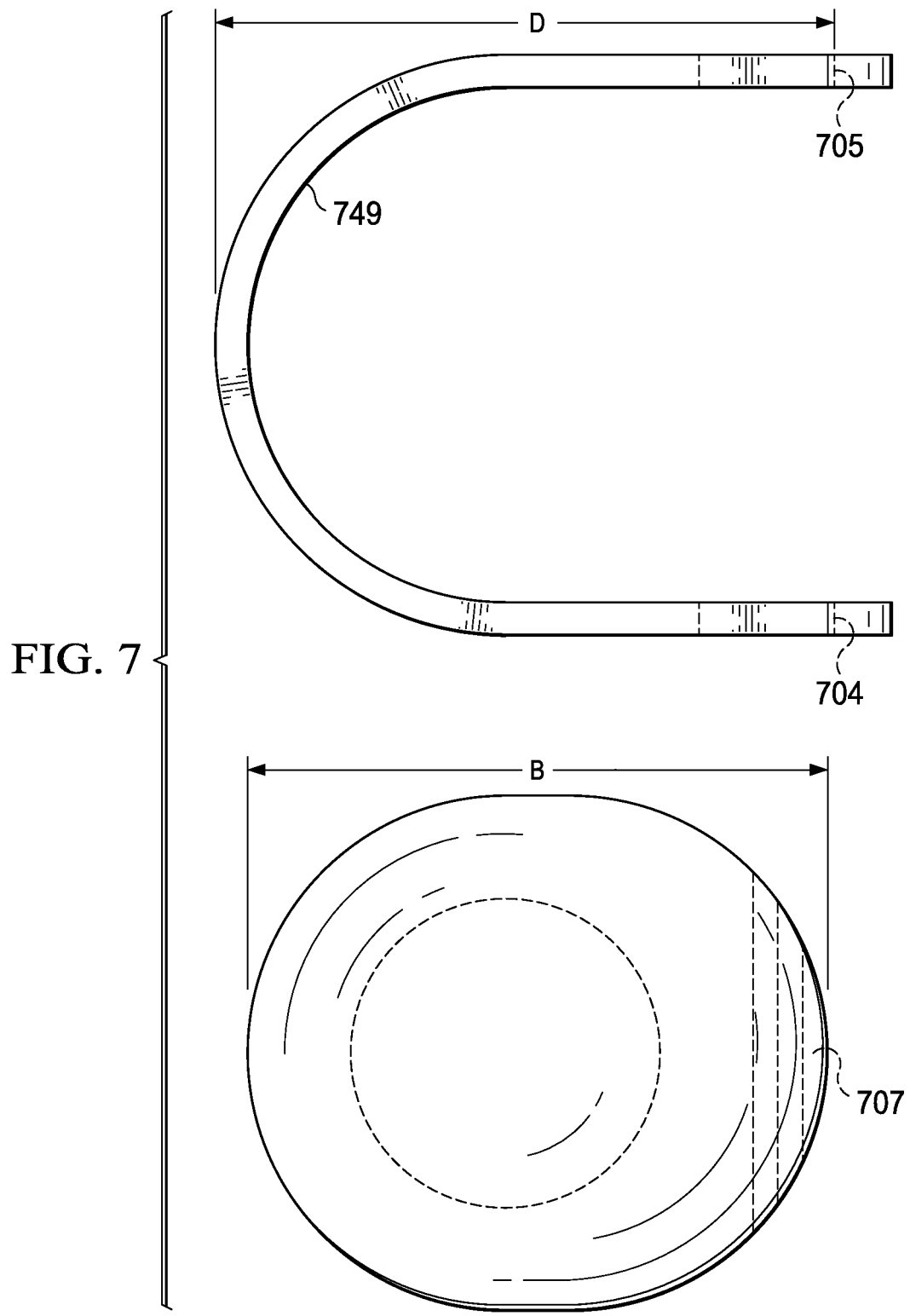
FIG. 7 is a top view of a strand clip and a post cover showing the relative distances in geometry in accordance with an illustrative embodiment of the invention.

FIG. 7 is a top view of a strand clip and a post cover showing the relative distances in geometry in accordance with an illustrative embodiment of the invention. In each of FIGS. 4A, 5A and 6, a strand clip facing backside as shown as strand clip facing backside 449, strand clip facing backside 549 and strand clip facing backside 649, respectively, are arranged in a geometry. The geometry is such that the distance between strand clip facing backside at the base of the 'U' shape is a distance, D, from a line extending between first prong strand capture surface and the second prong strand capture surface. Surface 705 and surface 704 depict the first prong strand capture surface and the second prong strand capture surface. To engage a post cover, distance, 'D', is narrower than a line connecting outer extremity of ledge 707 (for example, ledge surface 409 of FIG. 4A). The opposing backside of the post, depicted as the distance between arrows marked 'B', abuts to the base of the 'U' shape 749 of the strand clip.

Installation of a fence can be such that the fence posts and post covers face in the direction desired by the property owner. Each strand can be attached to a substantially immovable object at one end. Post covers can be placed over each post. At each post cover, each strand can be clipped to the post cover in the manner described above. Finally, tension can be applied at the loose ends of each strand in a way to provide integrity to the fence structure.

Installation of the post cover and strand clips may proceed in the following fashion. First, bare posts are installed into the ground, such as, for example T-posts. Next, post covers may be slid over each post so that the transverse groove faces into the pasture enclosing animals. In the case of the use of modular post cover 200 of FIG. 2, each modular post cover may be added to the exposed post until sufficient modular post covers are stacked a height at or near the top of the post. In other words, the modular post covers may be stacked to the height of the above-ground portion of the fence post. Each such modular post can be arranged to align transverse grooves to face into the pasture or other area that contains animals. Next, blunt top 250 may be placed so that reciprocal contours 251 are engaged with shoulders 231 of the top modular post cover.

Upon completing the assembly of the post cover(s) to the post, strands may be arranged so that each strand fits to a selected groove of the post cover. Next, a fence installer may add a strand clip to each groove by placing the lowest part of the U-shaped surface in contact with the opposing backside of the post in the manner shown in, for example, FIG. 4A. The prongs of each strand clip may point in the direction of the pasture on the same side as the transverse groove. Finally, the strand may be threaded through the assembly so that the strand fits between groove walls and each prong strand capture surface. Accordingly, in the example of FIG. 4A, the strand may be placed with first prong strand capture surface 456 on the right of the strand, groove wall 403 on the left of the strand, and second prong strand capture surface 454 on the right of the strand. The strand capture surfaces each act in opposition to the groove. Consequently, a strand that is stretched to an approximate line can touch each the groove wall and each such surface with some friction. This configuration allows the strand to be held in place. Tension may be applied to the strand after the strand is placed in the groove. These steps may be repeated for each groove upon which a strand is to be placed. If desired, panels may be attached or arranged on the posts.

It is appreciated that many variations of the embodiments are possible. For example, the blunt top shown in at least FIGS. 1A and 2B may extend beyond the perimeter of the extrusion portion of the post cover. Accordingly, in such a configuration, the top part of the post cover may be made blunter, and accordingly be suited to deflect larger animals from harm. In such an arrangement, an enlarged radius of the blunt top may produce a blunt top that more closely resembles a ball than the hemisphere shown in FIGS. 1A and 2B. Accordingly, the blunt top may have a surface area larger than a hemisphere having an identical radius.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A post cover for engaging with a fence post and supporting at least one strand, the post cover comprising:
   an extrusion portion supporting a strand-carrying portion, the strand-carrying portion formed of an electrically resistant material, wherein the strand-carrying portion has a transverse groove formed from an outer surface of the strand-carrying portion, the transverse groove providing a recess within the outer surface by at least an upper surface and a lower ledge; and
   a top portion supported by the strand-carrying portion, wherein the extrusion portion and strand-carrying portion each have a longitudinal cavity configured to admit the fence post;
   the top portion formed contiguous to the strand-carrying portion and comprising a dome-shaped extension to close the cavity from above, wherein the dome-shaped extension provides a blunt upper surface having an outermost width larger than a width of the longitudinal cavity and extending over the recess, wherein the transverse groove comprises a first sub-groove and a second sub-groove separated by a second ledge, wherein the second sub-groove has at least one vertical surface, that is vertically disposed above or below a vertical surface of the first sub-groove and the second sub-groove further comprises a triangular recess with an open side facing outward, and the first sub-groove and the second sub-groove are each open to receive the at least one strand from a direction transverse and to a side of the transverse groove of the post cover without obstruction, wherein the second ledge extends transversely as a flange having a horizontal top side, a bottom side parallel thereto, and a terminal edge; and wherein the second ledge is disposed between the upper surface and the lower ledge, which are horizontal, such that the terminal edge of the second ledge is located transversely inward of an outer extent of the upper surface and lower ledge.

2. The post cover of claim 1, wherein the transverse groove has a transverse length and longitudinal width, the longitudinal width being at least half an inch wide.

3. The post cover of claim 2, wherein the longitudinal width is more than half an inch and less than 1.63 inches.

4. The post cover of claim 3, wherein the first sub-groove has at least a half-inch width, and the second sub-groove has at least a one-inch width.

5. The post cover of claim 4, wherein the dome-shaped extension is above all other features of the post cover.

6. The post cover of claim 2, wherein the strand-carrying portion supports a strand capture device having at least one capture surface arranged in opposition to the transverse groove, whereby the strand capture device is arranged to hold the at least one strand between the at least one capture surface and the transverse groove.

7. A post cover for engaging with a fence post and supporting at least one strand, the post cover comprising:
   a first extrusion portion supporting a strand-carrying portion, the strand-carrying portion formed of an electrically resistant material and having an outer surface;
   a first top portion supported by the strand-carrying portion, wherein the first extrusion portion and strand-carrying portion each have a longitudinal cavity configured to admit the fence post, wherein the first top portion is formed contiguous to the strand-carrying portion and comprises an opening defined by at least one shoulder having a top contour matching a reciprocal contour of a second extrusion portion adapted to rigidly mate to the second extrusion support of a second post cover, and wherein the first extrusion portion has a shoulder corresponding to a reciprocal contour of a second top portion of a third post cover adapted to rigidly mate to the third post cover; and a transverse groove formed from the outer surface, which recesses within the outer surface by at least an upper surface and a lower ledge, which thereby is configured to provide limitations to vertical travel of the at least one strand selected from a group comprising a half-inch strand, a one-inch strand, and a one and a half-inches strand, wherein the transverse groove comprises a first sub-groove and a second sub-groove separated by a second ledge, and the second sub-groove further comprises a triangular recess with an open side facing outward, and, wherein the second sub-groove is vertically disposed above or below the first sub-groove and the first sub-groove and the second sub-groove are each open to receive the at least one strand from a direction transverse and to a side of the transverse groove of the first extrusion portion without obstruction and the second sub-groove has at least one vertical surface that is vertically disposed above or below a vertical surface of the first sub-groove, wherein the second ledge extends transversely as a flange having a horizontal top side, a bottom side parallel thereto, and a terminal edge; and wherein the second ledge is disposed between the upper surface and the lower ledge, which are horizontal, such that the terminal edge of the second ledge is located transversely inward of an outer extent of the upper surface and lower ledge.

8. The post cover of claim 7, wherein the transverse groove has a transverse length and a longitudinal width, the longitudinal width being at least half an inch wide.

9. The post cover of claim 8, wherein the first sub-groove has at least a longitudinal width of a half-inch, and the second sub-groove has at least a longitudinal width of one-inch, wherein the transverse groove is at least one and a half-inches in longitudinal width.

10. The post cover of claim 7, wherein the strand-carrying portion supports a strand capture device having at least one capture surface arranged in opposition to the transverse groove, whereby the strand capture device is arranged to hold the at least one strand between the at least one capture surface and the transverse groove.

11. The post cover of claim 10, wherein the at least one shoulder supports a blunt top at the top contour.

* * * * *